US009037664B1

(12) United States Patent
Gailloux et al.

(10) Patent No.: US 9,037,664 B1
(45) Date of Patent: *May 19, 2015

(54) PERSONALIZED INTEGRATED AUDIO SERVICES

(71) Applicant: Sprint Communications Company L.P., Overland Park, KS (US)

(72) Inventors: Michael A. Gailloux, Overland Park, KS (US); Kenneth W. Samson, Belton, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 110 days.

This patent is subject to a terminal disclaimer.

(21) Appl. No.: 13/710,431

(22) Filed: Dec. 10, 2012

Related U.S. Application Data

(63) Continuation of application No. 12/683,035, filed on Jan. 6, 2010, now Pat. No. 8,359,382.

(51) Int. Cl.
*G06F 15/16* (2006.01)
*H04L 29/06* (2006.01)

(52) U.S. Cl.
CPC ...................................... *H04L 65/60* (2013.01)

(58) Field of Classification Search
CPC ............................ G06F 17/30749; G06L 15/26
USPC .......................................... 709/223, 201, 206
See application file for complete search history.

(56) References Cited

U.S. PATENT DOCUMENTS

| 8,359,382 | B1 | 1/2013 | Gailloux et al. |
| 2001/0034225 | A1 | 10/2001 | Gupte et al. |
| 2005/0185918 | A1 | 8/2005 | Lowe |
| 2006/0136556 | A1 | 6/2006 | Stevens et al. |
| 2007/0097975 | A1 | 5/2007 | Rakers et al. |
| 2008/0268772 | A1 | 10/2008 | Linnamaki et al. |
| 2010/0020944 | A1 | 1/2010 | Ray |
| 2011/0119058 | A1 | 5/2011 | Berard et al. |

OTHER PUBLICATIONS

Sawhney, Nitin, et al., "Nomadic Radio: A Spatialized Audio Environment for Wearable Computing," International Symposium on Wearable Computing (ISWC'97), Oct. 13-14, 1997, pp. 1-3, http://web.media.mit.edu/~nitin/NomadicRadio/ISWC97/ISWC97.html, Cambridge, Massachusetts.
FAIPP Pre-Interview Communication dated Jun. 20, 2012, U.S. Appl. No. 12/683,035, filed Jan. 6, 2010.
FAIPP Office Action dated Aug. 8, 2012, U.S. Appl. No. 12/683,035, filed Jan. 6, 2010.
Notice of Allowance dated Sep. 13, 2012, U.S. Appl. No. 12/683,035, filed Jan. 6, 2010.

*Primary Examiner* — Philip B Tran

(57) ABSTRACT

A processor-implemented method of providing personalized integrated audio comprises maintaining, by a computer, a profile for a user, creating the audio stream to transmit to an audio play device associated with the user and inserting the music from a source into the audio stream, interrupting the insertion of the music into the audio stream, inserting a first audio message into the audio stream, and resuming insertion of the music into the audio stream after the completion of the first audio message. The profile comprises user specified preferences for music and a user-defined schedule of when insertion of audio messages from user selected subscribed information services are permitted into an audio stream, and the first audio message is selected by the computer from the user selected subscribed information services of the profile based on at least one of a time or a place of the audio play device.

20 Claims, 6 Drawing Sheets

PERSONALIZED INTEGRATED AUDIO SERVICES

CROSS-REFERENCE TO RELATED APPLICATIONS

This application is a continuation of and claims priority under 35 U.S.C. §120 to U.S. patent application Ser. No. 12/683,035, filed on Jan. 6, 2010, entitled "Personalized Integrated Audio Services," by Michael A. Gailloux, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Audio play devices comprising mobile telephones, personal digital assistants (PDA), media players, and other portable electronic devices may receive a plurality of content types from wireless communications services providers and other sources. Services received under subscription may comprise conventional telephone voice communication, short message service (SMS) messaging, commonly known as text messaging, multimedia message services (MMS) messaging, and electronic mail messaging. Other available services may comprise instant messaging or chat services, access to the world wide web of the Internet, and global positioning system services. A user of an audio play device may subscribe to additional information services including delivery of selected news, sports, business, weather, and traffic information made available under subscription. These additional services may be available from third-party information providers through the wireless communications services provider and bundled into the package of services received under the user's general account with the provider. Other audio services available may include talk radio and closed circuit content of live or taped proceedings that a user may be able to access under subscription.

SUMMARY

In an embodiment, a processor implemented method of providing personalized integrated audio is provided. The method comprises a computer creating an audio stream to transmit to an audio play device and inserting a music from a source into the audio stream. The method also comprises the computer interrupting the insertion of the music into the audio stream and the computer inserting a first audio message into the audio stream, wherein the first audio message is selected by the computer from subscribed information services based on at least one of a time and a place of the audio play device. The method also comprises the computer inserting a second audio message into the audio stream, wherein the second audio message comprises information converted from a text format of a message addressed to a communication system of the audio play device to an audio format. After the completion of one of the first audio message and the second audio message, the method also comprises the computer resuming insertion of the music into the audio stream.

In an embodiment, a system for creating personalized audio is provided. The system comprises a computer having a processor and a memory and an application stored in the memory that, when executed by the processor, composes a first audio stream for transmission to a play device, the first audio stream comprising a music from a source. The system also selects a first audio message based on at least a location of the play device and a time and inserts the first audio message into the audio stream. The system also converts one of an email message addressed to the play device and a text message addressed to the play device to an audio format to a second audio message. The system also inserts the second audio message into the audio stream and transmits the audio stream via a communication network to the play device.

In an embodiment, a processor-implemented method of providing personalized integrated audio is provided comprising a computer analyzing a profile of a first user to identify a first user music listening preference. The method also comprises the computer selecting a first music from a source based on the first user music listening preference and the computer composing a first audio stream to transmit to an audio play device of the first user, wherein the first audio stream comprises the first music. The method also comprises the computer transmitting the first audio stream to the audio play device of the first user over a communication network, wherein at least a portion of the communication network is provided by a wireless link. The method also comprises the computer identifying an interruption point in the first music and inserting a first audio message into the first audio stream after the interruption point, wherein the first audio message is one of a news message, a weather forecast message, and a sport score message. The method also comprises the computer converting one of an electronic mail message and a text message to a second audio message and the computer inserting the second audio message into the first audio stream.

In an embodiment, a processor-implemented method of providing personalized integrated audio comprises maintaining, by a computer, a profile for a user, creating the audio stream to transmit to an audio play device associated with the user and inserting the music from a source into the audio stream, interrupting the insertion of the music into the audio stream, inserting a first audio message into the audio stream, and resuming insertion of the music into the audio stream after the completion of the first audio message. The profile comprises user specified preferences for music and a user-defined schedule of when insertion of audio messages from user selected subscribed information services are permitted into an audio stream, and the first audio message is selected by the computer from the user selected subscribed information services of the profile based on at least one of a time or a place of the audio play device.

In an embodiment, a system for creating personalized audio comprises a computer having a processor and a memory; and an application stored in the memory that, when executed by the processor, maintains a profile for a user, composes the first audio stream for transmission to a play device associated with the user, the first audio stream comprising the music from a source, converts one of an email message addressed to the play device or a text message addressed to the play device to an audio format to a first audio message, inserts the first audio message into the audio stream, and transmits the audio stream via a communication network to the play device. The profile comprises user specified preferences for music and a user-defined schedule of when insertion of audio messages from user selected subscribed information services are permitted into an audio stream.

In an embodiment, a processor-implemented method of providing personalized integrated audio comprises maintaining, by a computer, a profile for a user, analyzing, by the computer, the profile of the first user to identify a first user music listening preference, selecting, by the computer, a first music from a source based on the first user music listening preference, composing, by the computer, the first audio stream to transmit to an audio play device of the first user, wherein the first audio stream comprises the first music, transmitting, by the computer, the first audio stream to the audio play device of the first user over a communication network, identifying, by the computer, an interruption point in the first music at a location based on the user-defined schedule in the profile and inserting a first audio message into the first audio stream after the interruption point, converting, by the computer, one of an electronic mail message or a text message to a second audio message, and inserting, by the computer, the second audio message into the first audio stream. The profile comprises user specified preferences for music and a user-defined schedule of when insertion of messages from user selected subscribed information services are permitted into a first audio stream. At least a portion of the communication network is provided by a wireless link, and the first audio message is selected by the computer from the user selected subscribed information services of the profile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
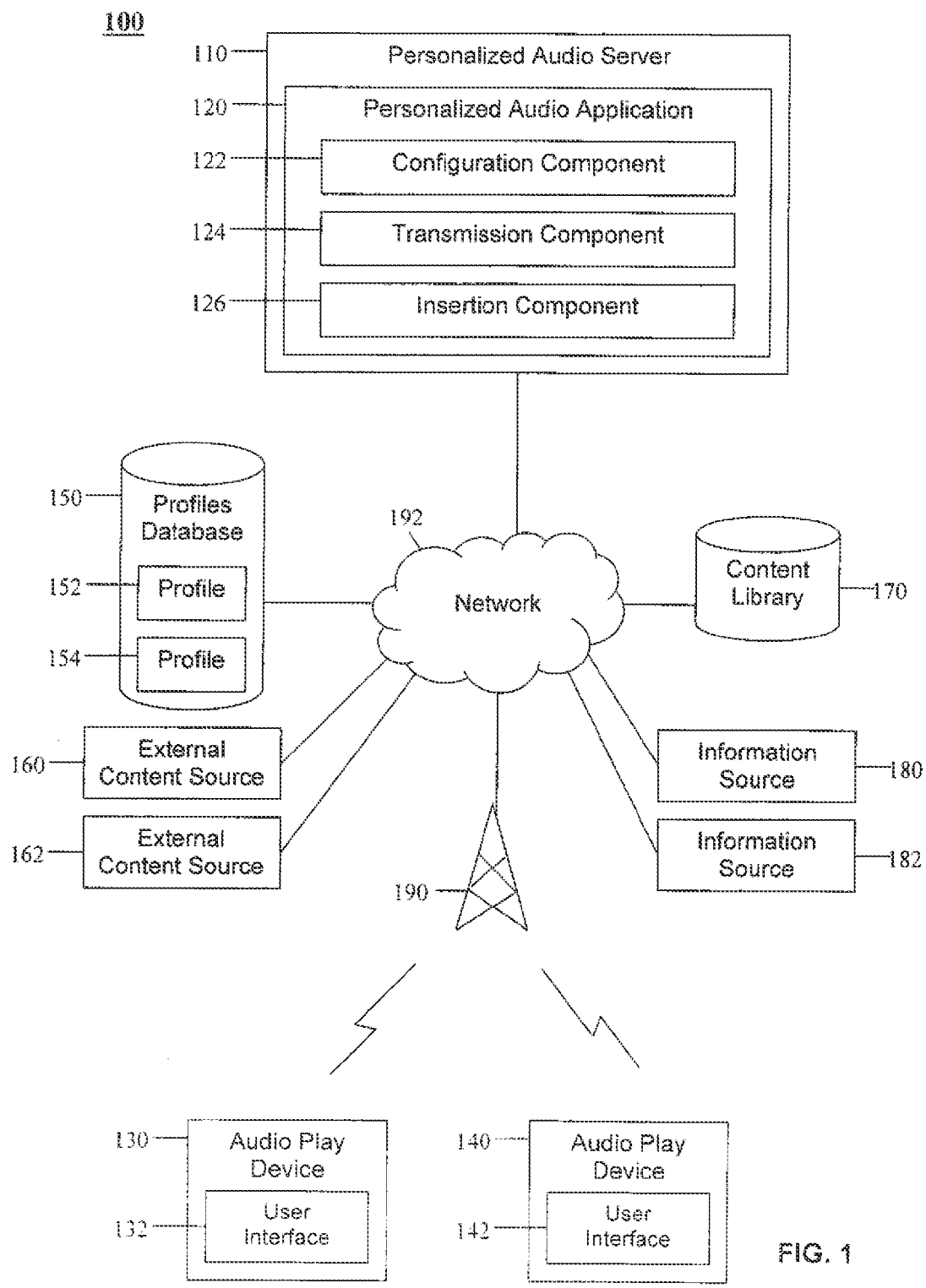
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure enables an audio play device to receive a personalized stream of audio content with limited automatically selected interruptions for alerts containing time-sensitive information and messages from designated senders. Personalized integrated audio services may stream personalized audio content, for example, music and may interrupt the audio streaming for alert messages containing specific information items, for example, news, weather, and traffic updates which have been designated in advance by a user and/or subscriber to the personalized integrated audio services. The user and/or subscriber may also designate in advance a schedule for news, weather, and/or traffic alert interruptions. Audio streaming may also be automatically interrupted for selected electronic mail messages and text messages converted to audio content and telephone voice mail messages sent by persons designated in advance by the user and/or subscriber, for example, specific family members and/or work colleagues. The music may be automatically selected based on a musical taste profile defined in advance by the user and/or subscriber.

The user of the audio play device wishing to devote full attention on work or another engagement may subscribe for continuous streaming of music or other audio content to accompany and complement the user's activity. The audio play device may be a mobile telephone. In addition to voice and data services, the user may subscribe for streaming of music or other audio content from its wireless communications service provider. The present disclosure teaches automatically selected interruptions of the audio stream for insertion of audio messages from sources, on subjects, and at times of the user's choosing. The audio messages interrupting the streamed content may be inserted immediately upon receipt by the provider with the streamed content abruptly interrupted. The audio messages may alternatively be inserted at logical breaks in the streamed content, for example, at the end of a streamed song or other piece of music. The user, as customer of the wireless communications service provider, may have full flexibility to configure how these interruptions are permitted.

Personalized integrated audio services may be configured to permit a user to create a plurality of schedules or profiles for streaming of audio and permitted interruptions for selected audio messages. Each profile may combine the user's choice of music or other content with a description of permitted interruptions for that particular profile. The user may maintain specific profiles for different times of the day, days of the week, and physical locations of the subscriber, for example, home, office, or automobile. The user may spontaneously create a temporary profile that suits the user's taste for content at that moment and combines the content with a schedule of permitted interruptions for that session.

Turning now to FIG. 1, a system 100 of personalized integrated audio is provided. The system 100 comprises a personalized audio server 110, a personalized audio application 120, audio play devices 130, 140, user interfaces 132, 142, a profiles database 150, profiles 152, 154, external content sources 160, 162, a content library 170, information sources 180, 182, a base transceiver system 190, and a network 192.

The personalized audio server 110 may be a computer system. Computer systems are discussed in greater detail hereinafter. The personalized audio server 110 may comprise one computer or a plurality of computers, for example, a server farm wherein many server computers cooperate to share a processing load. The personalized audio server 110 may comprise a plurality of computers that are located at different places, for example, to provide geographical diversity and increased service reliability. The personalized audio server 110 executes one or more applications including the personalized audio application 120.

The personalized audio application 120 executes on the personalized audio server 110 and wirelessly sends personalized streams of audible content to a plurality of audio play devices 130, 140. The audible content may comprise music or other media of types selected by users of the audio play devices 130, 140. The personalized audio application 120 inserts selected audio messages into the streams of audible content, the sources of the audio messages chosen by the users of the audio play devices 130, 140. The audio messages may comprise publicly available information, for example, news, business, weather, sports, or traffic information inserted into the personalized stream of content at intervals chosen by the user or upon the occurrence of specific events. The chosen audio messages inserted into the stream of music or other content may also comprise some private content specific to the individual user, for example, electronic mail and short message service (SMS) messages, commonly referred to as text messages, converted to audible content. The inserted messages may also comprise some telephone voice mail messages left for the user during the session. The personalized audio application 120 may store profiles 152, 154 for users of audio play devices 130, 140 describing their preferences for music and other content to be streamed to the audio play devices 130, 140. The profiles 152, 154 may also describe permitted interruptions of audio streams for playing of inserted audio messages including general public content received under subscription and private, user-specific content approved by the user of the audio play device 130.

The personalized audio server 110 may be operated by a provider of wireless communications services. The personalized audio application 120 may allow the user of an audio play device 130 subscribing to voice, data, and other services offered by the provider to subscribe for continuous streaming of music content from the personalized audio server 110 to the audio play device 130. When the user chooses, the user may activate the audio play device 130 to initiate a wireless audio streaming session with the personalized audio server 110 that is located remotely from the audio play device 130. The personalized audio application 120 begins streaming music or other content of a type chosen by the user to the audio play device 130. The personalized audio application 120 may have access to several sources of content of the user's specified type. Sources may comprise external content sources 160, 162, for example, satellite radio or conventional radio, a content library 170 containing digital audio files, or other sources. The audio play device 130 may be configured to play the audio content through its own speakers or attached headphones or earphones. The audio play device 130 may alternatively transmit the audio content to another proximate device equipped with its own speakers or other audio hardware. In an embodiment, the audio play device 130 may be a mobile telephone that relays a baseband audio signal to a speaker system using wireless communication. The mobile telephone may communicate directly to the speakers or through an intermediary computer. The wireless communication may use Bluetooth, WiFi, or other technology.

At predefined times, for example, at the end of a song, the personalized audio application 120 may insert items of audio content of types previously approved by the user of the audio play device 130. The content may be news about a subject of interest to the user with news about other subjects excluded. The audio play device 130 may configure its service to direct the personalized audio application 120 to interrupt the playing of a song if an item of news becomes available about a specifically designated subject of interest and is determined to be of an urgent nature. The present disclosure teaches the personalized audio application 120 providing the user the ability to specify the types of special audio content that may interrupt the regular playing of music during songs. The present disclosure additionally teaches how urgency is determined to designate audio content as special wherein music or other normally playing content may be interrupted during a song.

The personalized audio application 120 may insert audio clips that may comprise news, business, or sports items, for example, the subject matter of the audio clips selected beforehand by the user of the audio play device 130. The audio clips may comprise content that was originally or previously in text format and subsequently converted from text format to voice format or other audio format by the personalized audio application 120. The audio clips may have been converted from really simple syndication (RSS) feeds, hypertext markup language (HTML) content feeds, or other content. The personalized audio application 120 may comprise filtering functionality that may select specifically desired content from really simple syndication (RSS) feeds, hypertext markup language (HTML) content feeds, or other content for insertion into the stream of audio content.

The personalized audio application 120 may be configured to monitor messages sent to the user of the audio play device 130. At the time the audio play device 130 is playing music or other content received from the personalized audio server 110, the user may be engaged in work or some other activity and not notice when an electronic mail message, text message, or voice mail message is received. The user may direct that electronic mail and text messages received from certain senders at certain times and marked urgent be converted from text into voice format and inserted into the audio stream for immediate playing or playing at the next practical break, such as at the end of a song. The user may also direct that similarly urgent telephone voice mail messages left for the user be immediately played with the music interrupted or played at the next break point.

The personalized audio application 120 comprises the configuration component 122 that enrolls audio play devices 130, 140 for personalized audio services and configures the services upon user instruction. Audio play devices 130, 140 may be mobile telephones already subject to a subscription arrangement with a wireless communications service provider for voice telephone service, data services including electronic mail and text messaging, and other services. The configuration component 122 may combine the account for the personalized audio services with the existing general account that the user may have with the wireless provider. Enrollment may comprise installation of a user interface 132 in the audio play device 130 that the user may use to make selections of types of music or other content, scheduling for personalized audio services, and choices for insertion of messages.

The configuration component 122 permits selection of the desired types of music, music by specific artists, or even specific songs or musical pieces. Music selected may differ by times of day, days of the week, and physical location of the audio play device 130. The source of the content to be accessed by the personalized audio application 120 may be specified, whether the source is an external content source 160, 162, content library 170, or other source. Music may be drawn from different sources at different times. Music may be streamed at some times and other content, such as talk radio, may be streamed at other times, depending upon how configured. The choice of the source of music and type of music may affect the cost of the personalized audio services if the services are provided on a commercial basis. The audio play device 130 may specify personalized audio services to be available at all times of the day and all days of the weeks or only at selected times and/or on selected days. The audio play device 130 may permit the insertion of some commercial content into its personalized audio services and this may affect the cost of the services. The types of acceptable commercial content and permissible scheduling parameters for insertion of commercial content may also be specified.

The configuration component 122 also receives and configures choices about insertion of audio messages into the audio streams. The configuration component 122 records selections for the times and situations in which audio messages may be inserted into audio streams for each type of message. The user may direct specific times and specific senders wherein interruptions are permitted either between songs or during songs or otherwise during the playing of content.

The configuration component 122 may create at least one profile 152 for the audio play device 130 that stores information entered about the preferences for music types and sources, specific artists and songs, arrangement of content, types of permitted interruptions, and scheduling specifics for permitted interruptions. When the audio play device 130 may not be a mobile telephone, the configuration component 122 may store more than one profile 152, 154 for the audio play device 130, for example, when different members of a family, each with specific preferences, may use the audio play device 130 at different times of the day or days of the week. The configuration component 122 stores profiles 152, 154 in the profiles database 150.

The personalized audio application 120 also comprises the transmission component 124 that activates when contacted by the audio play device 130 with an active subscription for personalized audio services. Upon receiving contact to initiate a session, the transmission component 124 may request a user name or some other identification to determine the proper profile to draw from the profiles database 150. The transmission component 124 may in each case examine the at least one profile 152, 154 associated with the audio play device 130 to ascertain that the account of the audio play device 130 is in good standing and that the audio play device 130 is entitled under its subscription to receive audio streaming services at that particular time. Assuming these items are in order, the transmission component 124 accesses the source of music or other content specified in the profile 152. The source may be an external music source 160, for example, a conventional radio station or a satellite radio source. The source may be a content library 170 comprising a plurality of digital music files. The content library 170 may be publicly accessible on a commercial basis or may be limited to private accesses by specific parties. In an embodiment, the user of the audio play device 130 may construct his or her own private content library 170 and provide the personalized audio server 110 access to that private content library 170.

A customer of a wireless communications services provider accessing personalized integrated audio services may use these services in his automobile. The audio play device 130, for example, a mobile telephone may relay the chosen streamed audio content along with audio messages, including selected news, traffic, and other information items as well as messages from selected senders, to the automobile's sound system during the customer's daily commute, using either a wireless link or a wired link from the mobile telephone to the automobile's sounds system. The customer may also receive on his mobile phone streamed audio content with permitted interruptions during concentrated work periods in his office or other workplace. The customer may, for example, select his mobile telephone to wirelessly or via wired connection transmit received content and audio messages to his nearby computer via wireless or wired communication links for playing through speakers or headphones plugged into the computer. The normal telephone functionality of receiving and placing calls may remain accessible to the user during these sessions.

The personalized audio application 120 also comprises the insertion component 126 that selectively inserts audio messages into audio streams transmitted to the audio play device 130. Specifications for permitted interruptions may be stored in the profiles 152, 154 associated with the audio play device 130. When the transmission component 124 begins a session with the audio play device 130, it accesses one of the profiles 152, 154 appropriate for the particular user of the audio play device 130. The profile 152 may provide the specifications for insertion of audio messages during the session and may provide a different set of specifications depending on the time of day, day of week, and location of the audio play device 130. In an embodiment, the personalized audio application 120 could permit the audio play device 130 to specify more than one play list to choose from depending on the user's particular mood for music or other content at that time and location. The play list chosen could incorporate specifications for permitted interruptions that are specific to that play list. An audio play device 130 within at least one associated profile 152 could have several play lists providing types and sources of music, artists, and specific songs. The audio play device 130 could also have a group of specifications for permitted interruptions that could be chosen from depending on the user's circumstances and preferences at the time. The user could have the option to choose from a group of play lists and combine the chosen play list with a particular specification for permitted interruptions.

The insertion component 126 stands ready for the personalized audio server 110 to provide messages, signals, or interrupts indicating that an audio message permitted by the currently in-effect specification for permitted interruptions described in the profile 152 has been received. On a Sunday afternoon in the autumn, the audio play device 130 may permit interruptions between songs to be provided football score updates for specific games only. During the daytime on business days, the audio play device 130 may permit interruptions at any time, even in the middle of a song, if the price of a certain publicly traded stock reaches a certain predefined point. On weekdays late in the afternoon, the audio play device 130 may permit interruptions between or during songs for certain traffic updates. During sessions at those times when the audio play device 130 permits interruptions for audio messages for those types of information, the personalized audio server 110 maintains an open connection with the information sources 180, 182 of the desired information.

In practice, the personalized audio server 110 may provide personalized audio services to a plurality of audio play devices 130 and may maintain persistent open connections with a plurality of information sources 180, 182 of popular content. News, sports, traffic, stock quote, weather, and traffic information is generally received from information sources 180, 182 sources that sell or otherwise provide their information to the public. The profile 152 read at the beginning of the session provides the identity of the information sources 180, 182. The personalized audio server 110 generates separate, distinct, and independent streams of audio content for each audio play device 130, 140 accessing personalized integrated audio services.

The insertion component 126 inserts the audio message between songs or during a currently playing song if so directed. If content is inserted during songs, the transmission component 124 may record the playing of the song in a buffer until the audio message has completed playing and resume playing of the song from the buffer at the point at which the interruption began If the streamed audio content was being relayed from an external content source 160, the transmission component 124 can "catch up" with the audio feed from the external content source 160 by streaming the audio content to the audio play device 130 during commercial or other breaks, for example, taken by the external content source 160. The user of the audio play device 130 may use a control available in the user interface 132 to cancel or bypass the playing of an audio message and return immediately to the audio stream.

Messages sent by friends, family members, business associates, and other individuals intended specifically for the user of the audio play device 130 may at certain times be permitted to interrupt the audio stream of a session. These permitted interruptions are configurable by the audio play device 130 and may be described in schedules of permitted interruptions contained in the profile 152. The user of the audio play device 130 may wish all messages of any kind from his or her children or spouse to be converted to voice content and played immediately. The user may specify only text messages to be converted to audio and played immediately along with voice mail messages from family members. The user may specify the immediate interruption of streamed audio for some audio messages received from business associates and may specify that such audio messages be played between songs. The user may vary the schedule and rules for insertion of audio messages of various kinds from different senders by time of day, day of the week, user location, and other variables. The user may create various schedules of such permitted interruptions and combine them with play lists of audio content within a plurality of profiles 152, 154.

In addition to audio stream being interrupted for audio messages immediately and at logical breaks in the audio streams, the personalized audio application 120 may be configured to provide newly received audio messages at specified intervals, for example, every five, fifteen, or thirty minutes. The personalized audio application 120 may cause streamed audio to fade or reduce in volume while an audio message is being played instead of stopping the audio streaming. The personalized audio application 120 may permit the volume or other characteristics of audio messages, such as type and tone of voice and intensity, of inserted audio messages to be selectively varied according to sender, type of message, and urgency. The personalized audio application 120 may permit prioritization of audio messages by senders and types of messages and may suggest newly available audio content, such as new music, to the user for potential placement in a play list or creation of a new play list. The personalized audio server 110 may detect the physical location of the audio play device 130 and may suggest a profile 152, 154 to use based in part on the location of the audio play device 130.

The base transceiver station 190 may be any of a cellular wireless base station, for example, a Code Division Multiple Access (CDMA), Global System for Mobile Communications (GSM), Universal Mobile Communications System (UMTS), and/or Long-term Evolution (LTE) cellular wireless base station; a World-wide Interoperable Microwave Access (WiMAX) base station; a WiFi access point; a femtocell; or other wireless access devices. While FIG. 1 depicts only one base transceiver station 190, in an embodiment a plurality of base transceiver stations 190 may be existent and in operation.

The network 192 promotes communication between the components of the system 100. The network 192 may be any communication network including a public data network (PDN), a public switched telephone network (PSTN), a private network, and/or a combination thereof.

Figure 2:
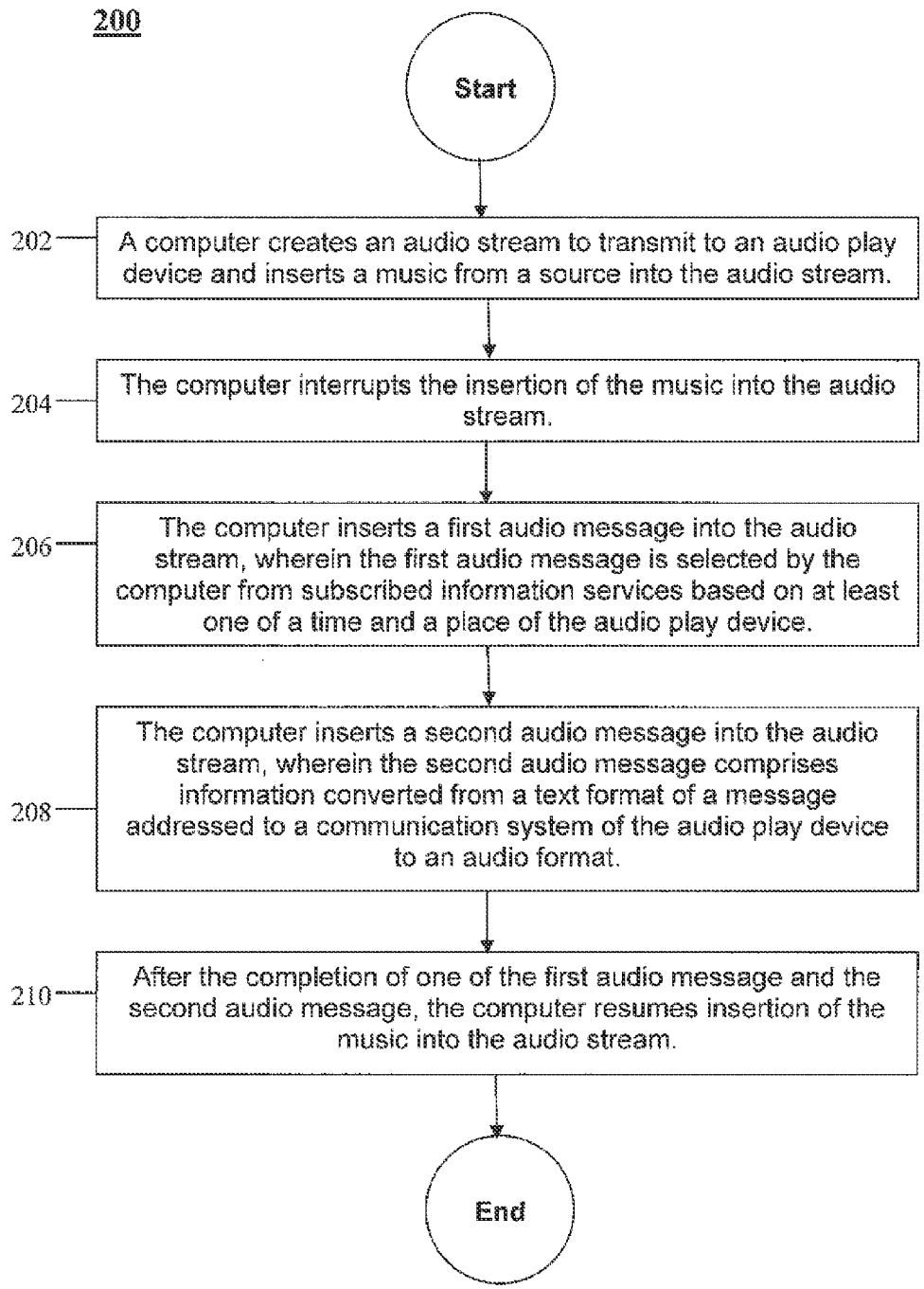
FIG. 2 is a flow chart illustrating a method according to an embodiment of the disclosure.

Turning now to FIG. 2, a processor-implemented method 200 of providing personalized integrated audio is provided. Beginning at block 202, a computer creates an audio stream to transmit to an audio play device 130 and inserts a music from a source into the audio stream. The computer may be the personalized audio server 110 and the source of the music may be at least one external content source 160, 162, for example, a radio broadcast, or a content library 170. The personalized audio server 110 may take this action because the audio play device 130 initiated a session for audio streaming services. The personalized audio application 120 may access a profile 152 from the profiles database 150 that describes the music that the user of the audio play device 130 wishes to hear and further describes the permitted interruptions during that session.

At block 204, the computer interrupts the insertion of the music into the audio stream. The personalized audio application 120 received a message from one of the information sources 180, 182, for example, a traffic information provider, or received a message from one of the senders permitted to interrupt as described in the profile 152.

At block 206, the computer inserts a first audio message into the audio stream, wherein the first audio message is selected by the computer from subscribed information services based on at least one of a time and place of the audio play device 130. The personalized audio server 110 may have loaded a profile 152 for the audio play device 130 based on the time of day and the detected location of the audio play device 130. If the information source 180 is a traffic information provider with which the user of the audio play device 130 has a subscription, the personalized audio application 120 may have received a traffic report about a geographic area or roadway of interest to the user of the audio play device 130. The personalized audio application 120 inserts the first audio message with the information about the traffic condition into the audio stream presently being provided to the audio play device 130. Whether the personalized audio application 120 interrupts the audio stream and plays the first audio message immediately or waits until the end of the song currently streaming or until another break point depends on the configuration entered by the user into the profile 152 and read by the personalized audio application 120.

At block 208, the computer inserts a second audio message into the audio stream, wherein the second audio message comprises information converted from a text format of a message addressed to a communication system of the audio play device 130 to an audio format. A family member, business associate, or other party preauthorized by the user of the audio play device 130 may have sent a text message to the user. The personalized audio application 120 converts the text message into audio format as the second audio message and inserts the second audio message into the audio stream. As with the actions at block 206, whether the personalized audio application 120 interrupts the audio stream and plays the second audio message immediately or waits until the end of the song currently streaming or until another break point depends on the configuration entered by the user into the profile 152 and read by the personalized audio application 120.

At block 210, after the completion of one of the first audio message and the second audio message, the computer resumes insertion of the music into the audio stream. When audio content, for example, music is being received from an external content source 160, such as a radio broadcaster or an Internet radio provider delivering content using the internet protocol (IP), the personalized audio application 120 may store the received content in a buffer during a period that an audio message is provided to the audio play device 130. When the audio message is complete and the interruption is ended, the personalized audio application 120 resumes the audio stream where it left off at the time of the interruption by streaming the content stored in the buffer. The personalized audio application 120 may then catch up with or become synchronized with the live broadcast from the external content source 160 by continuing to stream the music or other content while the external content source 160 has taken a commercial or other break from its playing of music.

Figure 3:
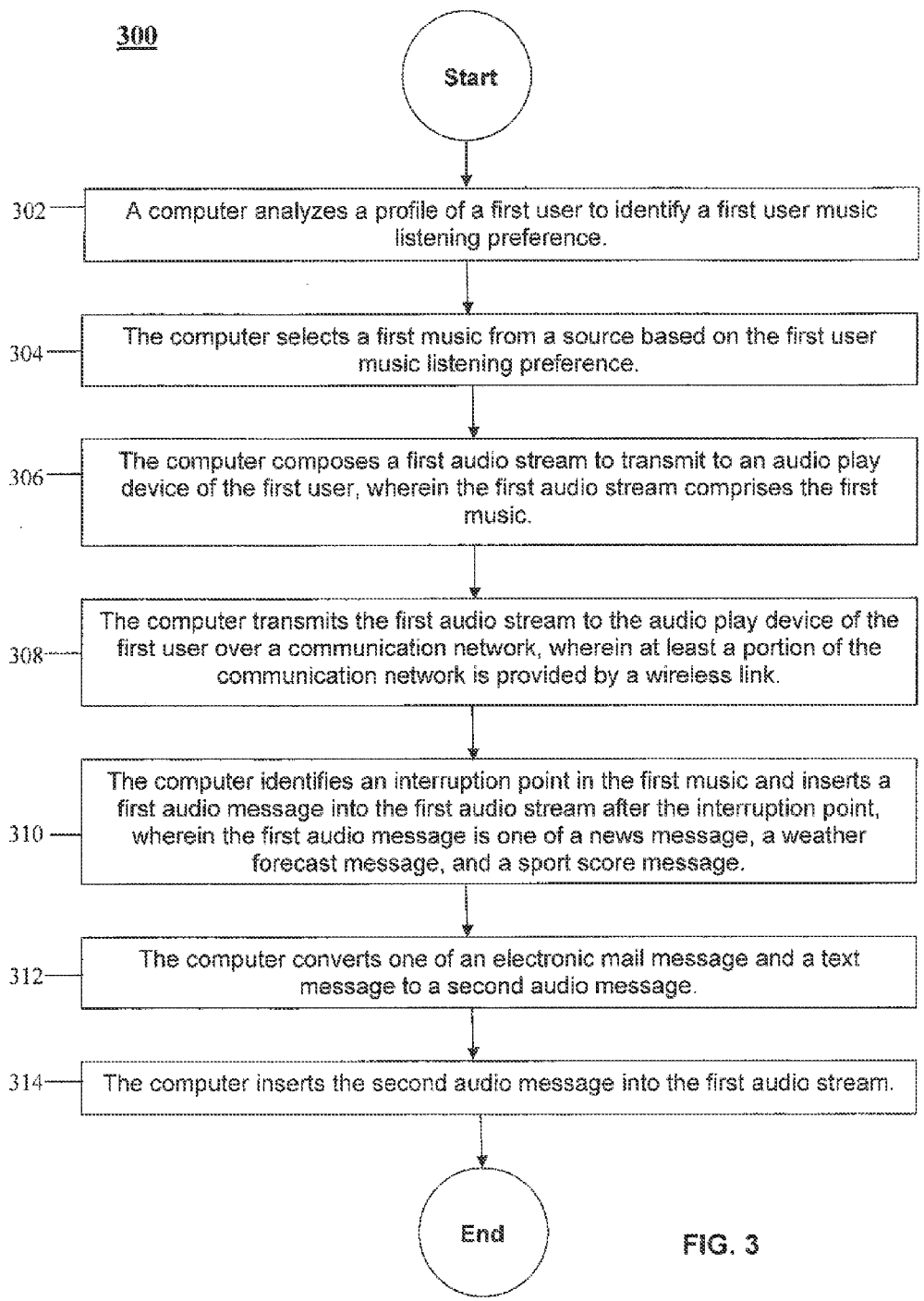
FIG. 3 is a flow chart illustrating another method according to an embodiment of the disclosure.

Turning now to FIG. 3, a method 300 of providing personalized integrated audio is provided. Beginning at block 302, a computer, for example, the personalized audio server 110, analyzes a profile 152 of a first user to identify a first user music listening preference.

At block 304, the computer selects a first music from a source based on the first user music listening preference. The source may be at least one of the external content sources 160, 162 comprising a conventional radio station, satellite radio provider, or another radio broadcaster that may provide content using the internet protocol (IP). The source may also be a content library 170 storing digital audio files.

At block 306, the computer composes a first audio stream to transmit to the audio play device 130 of the first user, wherein the first audio stream comprises the first music. At block 308, the computer transmits the first audio stream to the audio play device 130 of the first user over a communication network, wherein at least a portion of the communication network is provided by a wireless link.

At block 310, the computer identifies an interruption point in the first music and inserts a first audio message into the first audio stream after the interruption point, wherein the first audio message is one of a news message, a weather forecast message, and a sport score message. The interruption point may be during the playing of a song in the first music or at the end of the song. The profile 152 that may be read at the beginning of the personalized integrated audio session may describe appropriate interruption points.

At block 312, the computer converts one of an electronic mail message and a text message to a second audio message. At block 314, the computer inserts the second audio message into the first audio stream.

The present disclosure has described herein embodiments wherein a wireless communications services provider may operate the personalized audio server 110 and provide the personalized integrated audio services under subscription arrangement to the audio play device 130. Inherent in the descriptions of the embodiments is the understanding that the wireless communications services provider also provides voice telephone and data services that permit the provider to directly furnish text, electronic mail, voice mail messages to the audio play device 130 through the provider's messaging and storage infrastructure. In an embodiment, the wireless communications services provider or other operator of the personalized audio server 110 may not provide services that directly furnish text, electronic mail, voice mail messages to the audio play device 130 through the provider's messaging and storage infrastructure. The audio play device 130 may access those services from another entity. In such an embodiment, the personalized audio application 120 may provide an application programming interface (API) that enables the connection with outside providers of those services. Communication channels created using this application programming interface may enable the personalized audio application 120 to receive text, electronic mail, and voice mail messages from those outside providers and may enable the personalized audio application 120 to provide these messages as audio messages as described herein.

Figure 4:
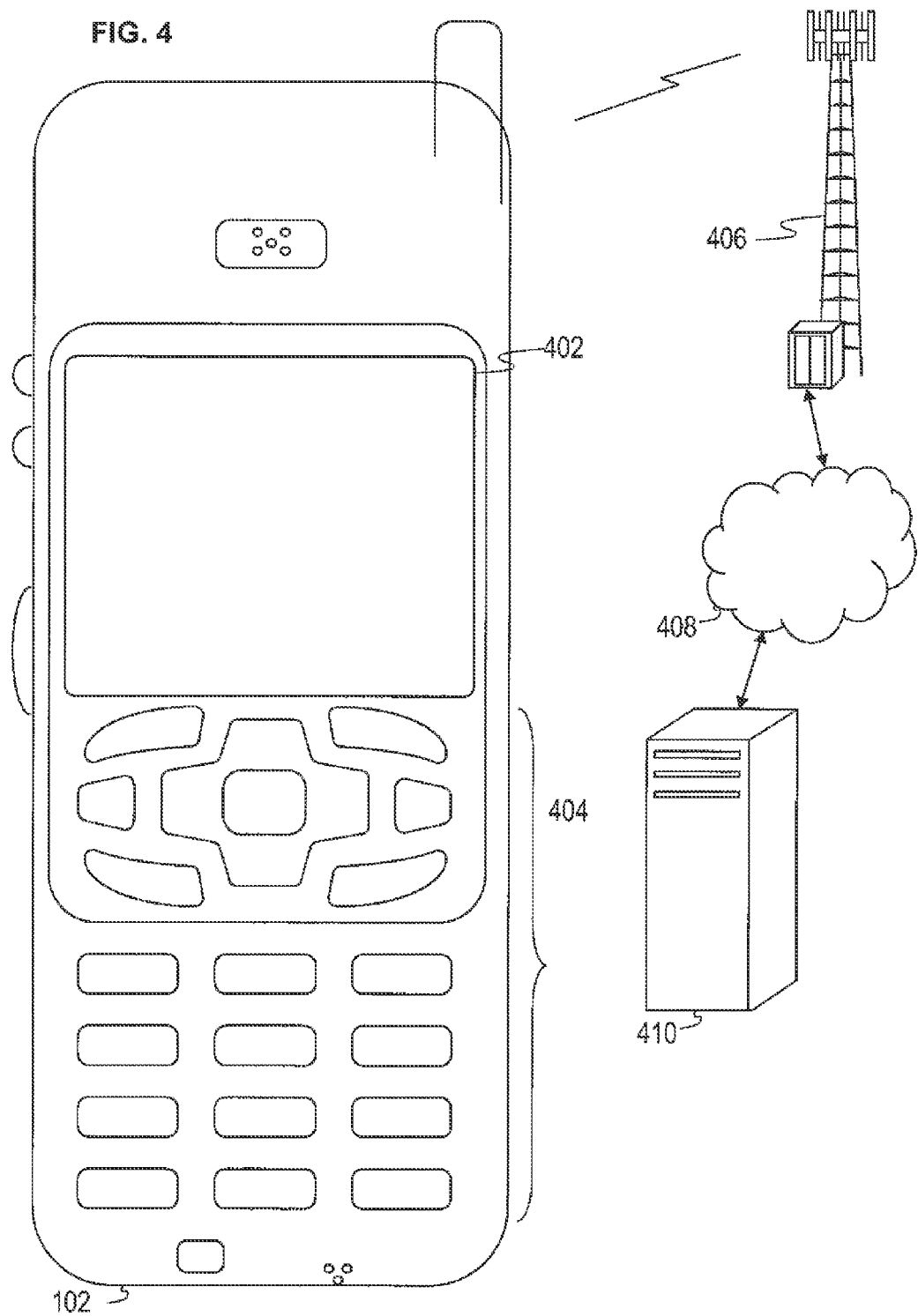
FIG. 4 is an illustration of a mobile device according to an embodiment of the disclosure.

FIG. 4 shows a wireless communications system including the mobile device 102. FIG. 4 depicts the mobile device 102, which is operable for implementing aspects of the present disclosure, but the present disclosure should not be limited to these implementations. The mobile device 102 may in some embodiments exemplify the audio play device 130, 140 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or personal digital assistant (PDA). The mobile device 102 may support specialized activities such as gaming, inventory control, job control, and/or task management functions, and so on.

The mobile device 102 includes a display 402 and a touch-sensitive surface and/or keys 404 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example, from a wireless base station, a wireless access point, or a peer mobile device 102.

The mobile device 102 may execute a web browser application which enables the display 402 to show a web page. The web page may be obtained via wireless communications with a base transceiver station (BTS) 406, a wireless network access node, a peer mobile device 102 or any other wireless communication network or system. While a single base transceiver station 406 is illustrated, it is understood that the wireless communication system may comprise additional base transceiver stations. In some instances, the mobile device 102 may be in communication with multiple base transceiver stations 406 at the same time. The base transceiver station 406 (or wireless network access node) is coupled to a wired network 408, such as the Internet. Via the wireless link and the wired network, the mobile device 102 has access to information on various servers, such as a server 410. The server 410 may provide content that may be shown on the display 402. Alternately, the mobile device 102 may access the base transceiver station 406 through a peer mobile device 102 acting as an intermediary, in a relay type or hop type of connection.

Figure 5:
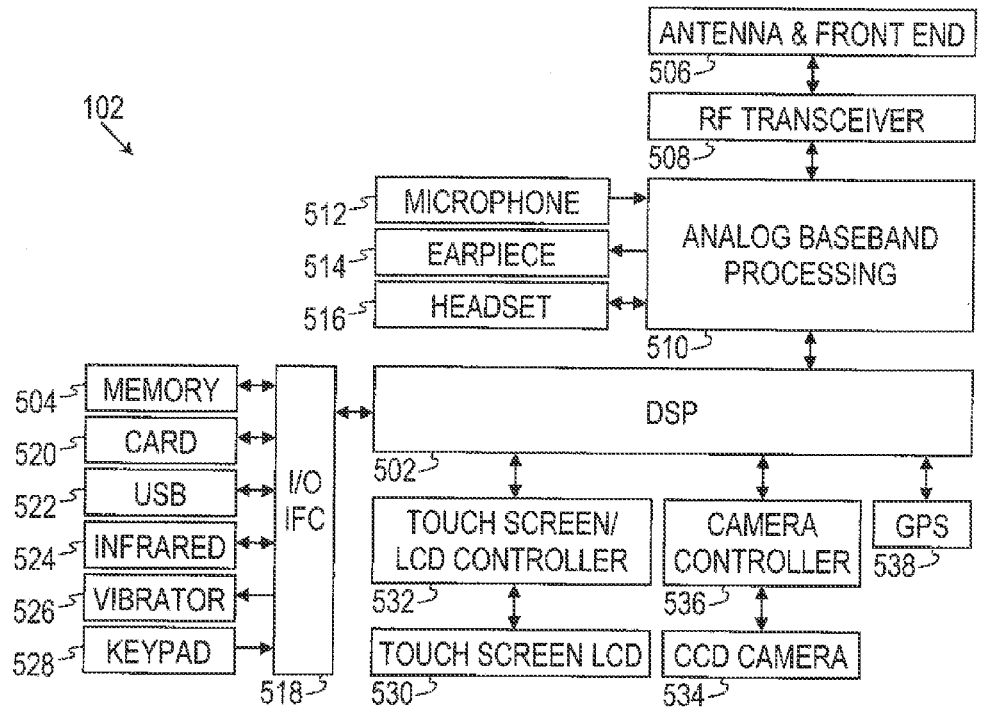
FIG. 5 is a block diagram of a mobile device according to an embodiment of the disclosure.

FIG. 5 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 502 and a memory 504. As shown, the mobile device 102 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 102 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 102 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 102 to send and receive information from a radio access network (RAN) or some other available wireless communications network or from a peer mobile device 102. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example, analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 102 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example, by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example, in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example, in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 102 to function as a peripheral device to exchange information with a personal computer or other computer system. The infrared port 524 and other optional ports such as a Bluetooth interface or an IEEE 802.11 compliant wireless interface may enable the mobile device 102 to communicate wirelessly with other nearby handsets and/or wireless base stations.

The input/output interface 518 may further connect the DSP 502 to the vibrator 526 that, when triggered, causes the mobile device 102 to vibrate. The vibrator 526 may serve as a mechanism for silently alerting the user to any of various events such as an incoming call, a new text message, and an appointment reminder.

The keypad 528 couples to the DSP 502 via the input/output interface 518 to provide one mechanism for the user to make selections, enter information, and otherwise provide input to the mobile device 102. Another input mechanism may be the touch screen LCD 530, which may also display text and/or graphics to the user. The touch screen LCD controller 532 couples the DSP 502 to the touch screen LCD 530.

The CCD camera 534 enables the mobile device 102 to take digital pictures. The DSP 502 communicates with the CCD camera 534 via the camera controller 536. The GPS sensor 538 is coupled to the DSP 502 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 6:
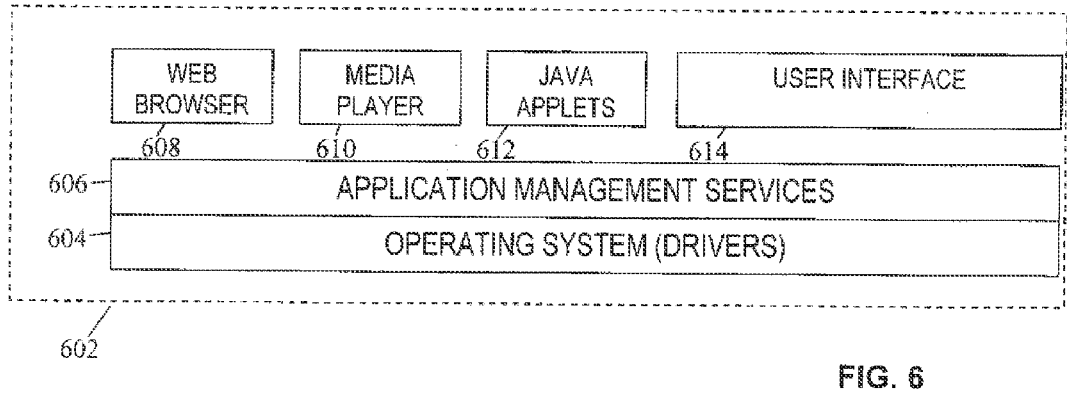
FIG. 6 is a block diagram of a software configuration for a mobile device according to an embodiment of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the mobile device 102. Also shown in FIG. 6 are a web browser application 608, a media player application 610, and JAVA applets 612. The web browser application 608 configures the mobile device 102 to operate as a web browser, allowing a user to enter information into forms and select links to retrieve and view web pages. The media player application 610 configures the mobile device 102 to retrieve and play audio or audiovisual media. The JAVA applets 612 configure the mobile device 102 to provide games, utilities, and other functionality. The user interface 614 may be equivalent to the user interfaces 132, 142 provided by the system 100.

Figure 7:
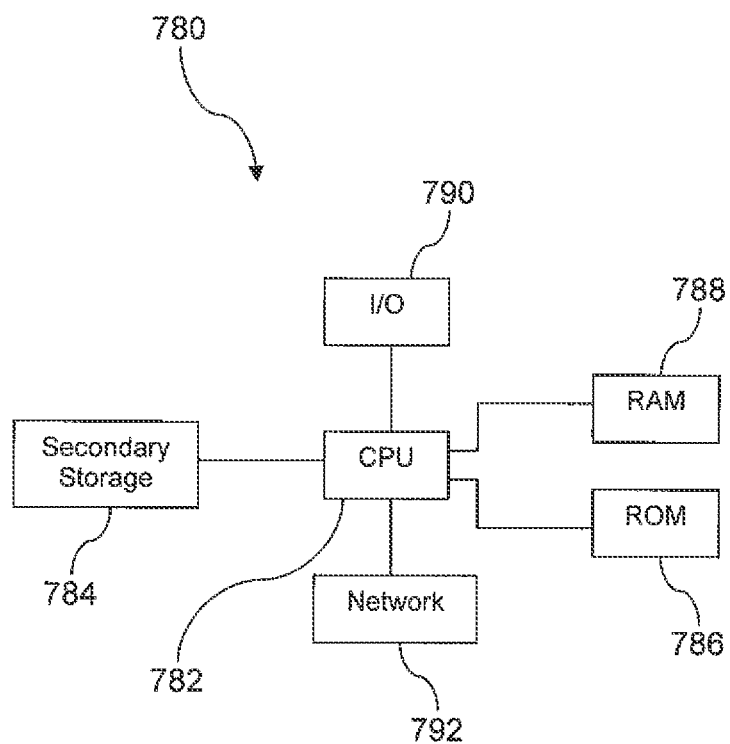
FIG. 7 illustrates an exemplary computer system suitable for implementing some aspects of the several embodiments of the disclosure.

FIG. 7 illustrates a computer system 780 suitable for implementing one or more embodiments disclosed herein. The computer system 780 includes a processor 782 (which may be referred to as a central processor unit or CPU) that is in communication with memory devices including secondary storage 784, read only memory (ROM) 786, random access memory (RAM) 788, input/output (I/O) devices 790, and network connectivity devices 792. The processor 782 may be implemented as one or more CPU chips.

It is understood that by programming and/or loading executable instructions onto the computer system 780, at least one of the CPU 782, the RAM 788, and the ROM 786 are changed, transforming the computer system 780 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example, in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 784 is typically comprised of one or more disk drives or tape drives and is used for non-volatile storage of data and as an over-flow data storage device if RAM 788 is not large enough to hold all working data. Secondary storage 784 may be used to store programs which are loaded into RAM 788 when such programs are selected for execution. The ROM 786 is used to store instructions and perhaps data which are read during program execution. ROM 786 is a non-volatile memory device which typically has a small memory capacity relative to the larger memory capacity of secondary storage 784. The RAM 788 is used to store volatile data and perhaps to store instructions. Access to both ROM 786 and RAM 788 is typically faster than to secondary storage 784.

I/O devices 790 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 792 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), world-wide interoperability for microwave access (WiMAX), and/or other air interface protocol radio transceiver cards, and other well-known network devices. These network connectivity devices 792 may enable the processor 782 to communicate with an Internet or one or more intranets. With such a network connection, it is contemplated that the processor 782 might receive information from the network, or might output information to the network in the course of performing the above-described method steps. Such information, which is often represented as a sequence of instructions to be executed using processor 782, may be received from and outputted to the network, for example, in the form of a computer data signal embodied in a carrier wave.

Such information, which may include data or instructions to be executed using processor 782 for example, may be received from and outputted to the network, for example, in the form of a computer data baseband signal or signal embodied in a carrier wave. The baseband signal or signal embodied in the carrier wave generated by the network connectivity devices 792 may propagate in or on the surface of electrical conductors, in coaxial cables, in waveguides, in an optical conduit, for example, an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The processor 782 executes instructions, codes, computer programs, scripts which it accesses from hard disk, floppy disk, optical disk (these various disk based systems may all be considered secondary storage 784), ROM 786, RAM 788, or the network connectivity devices 792. While only one processor 782 is shown, multiple processors may be present. Thus, while instructions may be discussed as executed by a processor, the instructions may be executed simultaneously, serially, or otherwise executed by one or multiple processors.

In an embodiment, the computer system 780 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 780 to provide the functionality of a number of servers that is not directly bound to the number of computers in the computer system 780. For example, virtualization software may provide 20 virtual servers on 4 physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example, analog magnetic tape, compact disk read only memory (CD-ROM) disks, floppy disks, jump drives, digital cards, multimedia cards, and others. The computer program product may be suitable for loading, by the computer system 780, at least portions of the contents of the computer program product to the secondary storage 784, to the ROM 786, to the RAM 788, and/or to other non-volatile memory and volatile memory of the computer system 780. The processor 782 may process the executable instructions and/or data in part by directly accessing the computer program product, for example, by reading from a CD-ROM disk inserted into a disk drive peripheral of the computer system 780. The computer program product may comprise instructions that promote the loading and/or copying of data, data structures, files, and/or executable instructions to the secondary storage 784, to the ROM 786, to the RAM 788, and/or to other non-volatile memory and volatile memory of the computer system 780.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A processor-implemented method of providing personalized integrated audio, the method comprising:
    maintaining, by a computer, a profile for a user, wherein the profile comprises user specified preferences for music and a user-defined schedule of when insertion of audio messages from user selected subscribed information services are permitted into an audio stream;
    creating, by the computer, the audio stream to transmit to an audio play device associated with the user and inserting the music from a source into the audio stream;
    interrupting, by the computer, the insertion of the music into the audio stream;
    inserting, by the computer, an audio message into the audio stream at a location based on the user-defined schedule in the profile, wherein the audio message is selected by the computer from the user selected subscribed information services of the profile based on at least one of a time or a place of the audio play device; and
    after the completion of the audio message, resuming, by the computer, insertion of the music into the audio stream.

2. The method of claim 1, further comprising:
    inserting, by the computer, a second audio message into the audio stream, wherein the second audio message comprises information converted from a text format of a message addressed to a communication system of the audio play device to an audio format.

3. The method of claim 2, wherein the message addressed to the communication system of the audio play device is an electronic mail (email) message, a simple message system (SMS) text message, or a multimedia message system (MMS) text message.

4. The method of claim 1, wherein the source of the music comprises one of a frequency modulation (FM) radio transmission, a satellite radio transmission, or a stored music source.

5. The method of claim 1, wherein interrupting the insertion of the music into the audio stream is subsequent to transmitting at least a portion of the audio stream to the audio play device.

6. A system for creating personalized audio, the system comprising:
    a computer having a processor and a non-transitory memory; and
    an application stored in the non-transitory memory that, when executed by the processor, configures the processor to:
        maintain a profile for a user, wherein the profile comprises user specified preferences for music and a user-defined schedule of when insertion of audio messages from user selected subscribed information services are permitted into an audio stream,
        compose the audio stream for transmission to a play device associated with the user, the audio stream comprising the music from a source,
        convert one of an email message addressed to the play device or a text message addressed to the play device to an audio format to an audio message, insert the audio message into the audio stream at a location based on the user-defined schedule in the profile, and transmit the audio stream via a communication network to the play device.

7. The system of claim 6, wherein the processor is further configured to:

select a second audio message from the user selected subscribed information services of the profile based on at least one of a location of the play device or a time, wherein the user selected subscribed information services comprise one or more of news, sports, business, weather, stocks, and traffic information; and insert the second audio message into the audio stream at a location based on the user-defined schedule in the profile.

8. The system of claim 7, wherein the second audio message is a news audio message or a weather forecast audio message, the second audio message being associated with a communication service subscribed to by the user of the play device.

9. The system of claim 7, wherein the second audio message is a stock quote audio message that is associated with a communication service subscribed to by the user of the play device.

10. The system of claim 6, wherein the communication network comprises a wireless link.

11. The system of claim 10, wherein the radio broadcast comprises one of an amplitude modulation (AM) radio broadcast, a frequency modulation (FM) radio broadcast, or a satellite radio broadcast.

12. The system of claim 6, wherein the source of the music comprises at least one of a radio broadcast or a digital audio file.

13. The system of claim 6, wherein the application configures the processor to insert the audio message into the audio stream subsequent to transmission of at least a portion of the audio stream to the audio play device.

14. A processor-implemented method of providing personalized integrated audio, the method comprising:

maintaining, by a computer, a profile for a user, wherein the profile comprises user specified preferences for music and a user-defined schedule of when insertion of messages from user selected subscribed information services are permitted into an audio stream;

analyzing, by the computer, the profile of the user to identify a user music listening preference;

selecting, by the computer, music from a source based on the user music listening preference;

composing, by the computer, the audio stream to transmit to an audio play device of the user, wherein the audio stream comprises the music;

transmitting, by the computer, the audio stream to the audio play device of the user over a communication network, wherein at least a portion of the communication network is provided by a wireless link;

identifying, by the computer, an interruption point in the music at a location based on the user-defined schedule in the profile; and inserting an audio message into the audio stream based on the identification of the interruption point, wherein the audio message is selected by the computer from the user selected subscribed information services of the profile.

15. The method of claim 14, further comprising:

converting, by the computer, one of an electronic mail message or a text message to a second audio message;

inserting, by the computer, the second audio message into the audio stream;

analyzing, by the computer, a profile of a second user to identify a second user music listening preference;

selecting, by the computer, a second music from a source based on the second user music listening preference;

composing, by the computer, a second audio stream to transmit to an audio play device of the second user, wherein the second audio stream comprises the second music;

transmitting, by the computer, the second audio stream to the audio play device of the second user over a communication network, wherein at least a portion of the communication network is provided by a wireless link; and identifying, by the computer, an interruption point in the second music and inserting a second audio message into the second audio stream, wherein the second audio message is one of a news message, a stock quote, a weather forecast message, or a sport score message.

16. The method of claim 15, further comprising: selecting, by the computer, the one of the electronic mail message or the text message from a plurality of messages based on a priority of the one of the electronic mail message and the text message.

17. The method of claim 14, wherein the wireless link is provided by one of a code division multiple access (CDMA) wireless technology, a global system for mobile communication (GSM) wireless technology, a long-term evolution (LTE) wireless technology, a worldwide interoperability for microwave access (WiMAX) wireless technology, a Bluetooth wireless technology, or a WiFi wireless technology.

18. The method of claim 14, further comprising maintaining, by the computer, a plurality of profiles for the user, wherein the plurality of profiles are specific to at least one of a time of day, a time of week, or a location of the user.

19. The method of claim 14, wherein the audio message is selected by the computer from the user selected subscribed information services of the profile based on at least one of a time or a place of the audio play device of the user.

20. The method of claim 14, wherein identifying an interruption point in the music at a location based on the user-defined schedule in the profile is subsequent to transmitting at least a portion of the audio stream to the audio play device.

* * * * *